United States Patent [19]

Wiart

[11] 4,405,888
[45] Sep. 20, 1983

[54] ADAPTER FOR INTERMEDIARY CIRCUIT OF A STATIC CONVERTER ASSEMBLY

[75] Inventor: Albert C. Wiart, Sannois, France

[73] Assignee: Jeumont Schneider Corporation, Puteaux, France

[21] Appl. No.: 256,115

[22] Filed: Apr. 21, 1981

[30] Foreign Application Priority Data

Apr. 24, 1980 [FR] France ............... 80 09187

[51] Int. Cl.$^3$ ............... H02P 5/40; H02M 5/45
[52] U.S. Cl. ............... 318/803; 363/37; 363/138
[58] Field of Search ............... 363/34, 36, 37, 38, 363/40, 71, 96, 136–138, 39, 44; 318/803, 811

[56] References Cited

U.S. PATENT DOCUMENTS

| | | | |
|---|---|---|---|
| 3,825,814 | 7/1974 | Pelly | 363/39 |
| 4,241,395 | 12/1980 | Stacey et al. | 363/39 |
| 4,247,887 | 1/1981 | Chin | 363/37 |

FOREIGN PATENT DOCUMENTS

| | | | |
|---|---|---|---|
| 52-28616 | 3/1977 | Japan | 318/803 |
| 54-735 | 6/1979 | Japan | 363/37 |
| 54-3226 | 11/1979 | Japan | 363/37 |

Primary Examiner—William H. Beha, Jr.
Attorney, Agent, or Firm—Rines and Rines, Shapiro and Shapiro

[57] ABSTRACT

The invention concerns the transformation of alternating or direct current input power to alternating current output power with intermediary transformation in direct current by means of static converters.

According to the invention, an adapter placed in the direct current intermediary circuit (4) comprises a branch connected between the output terminals of the input converter (5), and contains in series a free wheel thyristor (18) and an inductance (16) whose value is equal to the total loss inductance of the motor (1) connected to the reversible output inverter (20).

The purpose is to reduce the current wave harmonics in the power supply.

2 Claims, 2 Drawing Figures

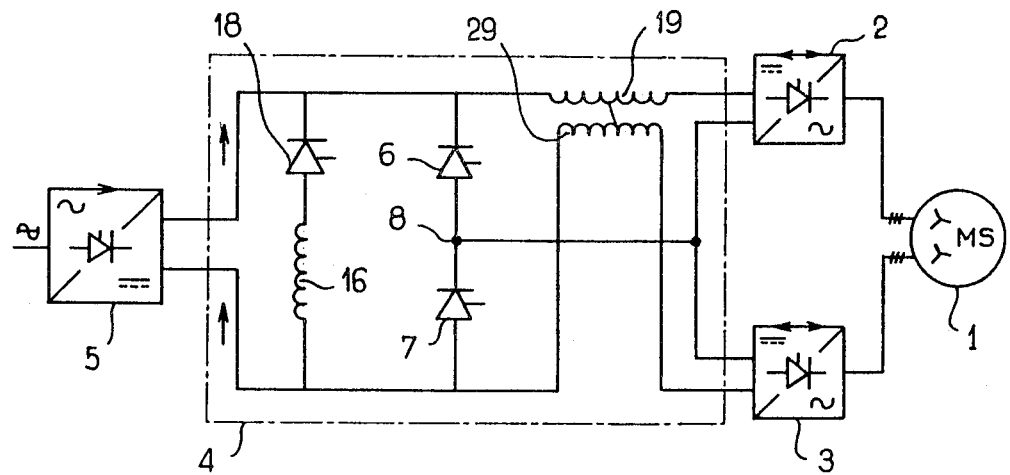
FIG_1
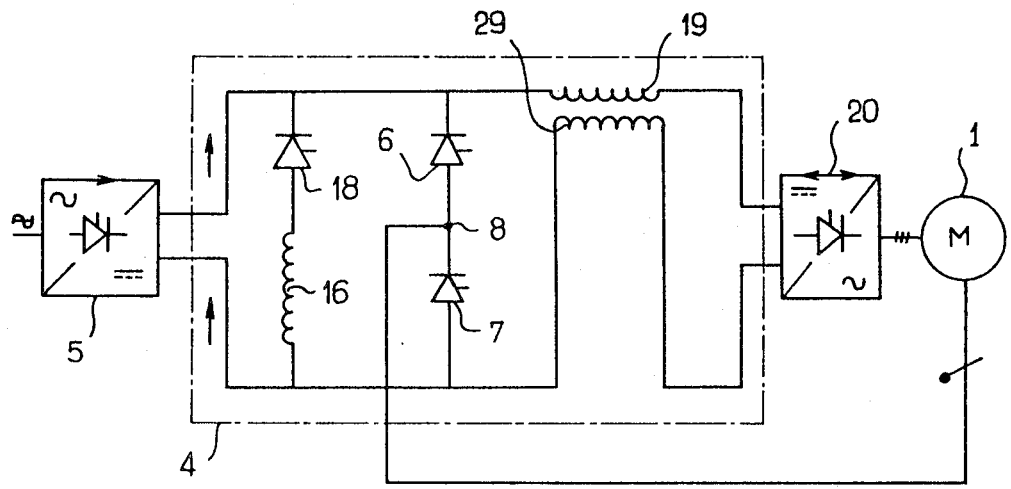
FIG_2

ADAPTER FOR INTERMEDIARY CIRCUIT OF A STATIC CONVERTER ASSEMBLY

The present invention concerns the transformation of input power of alternating or direct current to output power of alternating current, with intermediary transformation in direct current by means of static converters; the invention being more particularly concerned with an adapter placed in the intermediary circuit so as to avoid the formation of variable frequency current harmonics in the input power supply circuit in the commutation of the static converter thyristors or similar switching components therein employed.

It is known that because of the successive commutations of thyristors or the like, variable frequency harmonics, especially at low speeds of an electric motor utilizing alternating current output power, are added to the fixed frequency harmonics engendered by the normal commutations of the thyristors of the input converter connected to the power line. These variable frequency harmonics are difficult to eliminate by filtering, and can seriously affect the operation of track or signaling circuits when the motor is used for railway traction.

The present invention has as its object to modify the form of the current waves impressed on the input power line so as to reduce the perturbations in that line while at the same time permitting a significant reduction of the fixed frequency harmonic losses.

A further object is to provide a novel static converter assembly of more general improvement as well.

Other and further objects will be explained hereinafter and are more particularly delineated in the appended claims.

To attain these objectives, in accordance with the invention, the adapter, placed in the intermediary direct current circuit, is constituted by a branch connected between the output terminals of the input converter, and comprising in series a free-wheeling thyristor or similar switching device, and on inductance whose value is equal to the total loss inductance of the electric motor connected to the output converter. In summary, from one of its viewpoints, the invention embraces an adapter for insertion in the direct current intermediary circuit of an assembly for the transformation of input power to output alternating current power by means of switching input and output static converter means and having electric motor means connected to the output converter means characterized in that the adapter includes a branch containing in series a free wheel switch and an inductance the value of which is adjusted to be equal to the total loss inductance of the said electric motor, with the said branch being connected between the output terminals of the input converter means.

The present invention will be better understood, and other objects, advantages and characteristics will appear more clearly by the following description of various preferred modes of realization, given in an exemplary and nonlimitational way to illustrate the invention in connection with the appended drawings, FIG. 1 of which represents the electrical schematic of an alternating current power supply circuit of an electrical motor with two secondary windings, in conformance with a preferred mode of the present invention; and FIG. 2 represents a variant of the electrical schematic of FIG. 1 applied to the alternating current power supply of an electric motor with a single secondary winding and with a neutral output.

With reference to FIG. 1, a motor 1 which contains two secondary windings, may be powered as shown. The two secondary windings of the motor 1 are connected respectively to the output terminals of two reversible inverters 2 and 3, whose input terminals are connected to the direct current intermediary circuit 4, connected to the terminals of the thyristor rectifier 5.

The intermediary circuit 4 includes two inductances 19, 29 with a high coupling factor by mutual inductance, whose principal function is to ensure uniformity of the current applied to the motors, at the same time permitting instantaneous transfer of current from one secondary winding of the motor 1 to the other under commutation of the thyristors of the inverters in starting or at low speeds of the motor.

A branch containing the thyristors 6 and 7 placed in series is connected between the input terminals of the intermediary circuit 4, these terminals being connected to the output terminals of the rectifier 5. The common point 8 of the two thyristors 6, 7 is connected to the terminals of an inverse polarity input of the reversible inverters 2 and 3, the terminals being linked together, while two inductances 19, 29 of the same value and with a high mutual inductance coupling coefficient are placed respectively between the two input terminals of the intermediary circuit 4 and the other two inverse polarity terminals of the two reversible inverters 2 and 3.

Connected between the output terminals of the input converter 5, the branch of the adaptor circuit conforming to the invention is constituted by the thyristor 18 and the inductance 16 connected in series.

In operation, when it is desired to establish a commutation of the thyristors of the inverter 2, the thyristor 7 is initiated when the instantaneous voltage is negative. A free-wheeling circuit is thus established by the intermediary of the thyristor 7, the inverter 3 and the inductance 29. All the negative voltage is applied to the circuit constituted by the thyristor 6, the inductance 19 and the inverter 2. Because of the high coefficient of mutual inductance between the windings 19 and 29, the current disappears in the winding 19 and in the inverter 2, to reappear, doubled, in the circuit constituted by the tyristor 7 and the inverter 3. This transfer, however, takes palce with a delay determined by the value of the voltage and the value of the loss inductances of the motor and of the mutual inductance. The motor current passes through the free-wheeling circuit, and thus disappears from the power supply.

The commutation of the thyristors of the rectifier 5 is then ordered; the instantaneous voltage in the direct current circuit again becomes positive, and the current reappears. As long as the free wheeling functions, the positive voltage is applied to the inverter 2. The current reappears in this inverter, and consequently on the input line, with a delay again determined by the instantaneous value of the voltage applied by the rectifier 5 and the loss inductances of the motor and of the mutual inductance.

When no commutation is to be effected among the thyristors of the inverters 2 and 3 during periodic commutations of the thyristors of the rectifier 5, the change of sign of the current in the line would be much more rapid than described above, were it not for the addition of the branch consisting of the inductance 16 and the thyristor 18 placed in series; the current in the line would then take on the form of rectangular waves or peaks, whereas when commutation is established, the current in the line takes on a trapezoidal form.

The alternation of trapezoidal and rectangular waves at the frequency of commutation of the current to the motor impresses on the input line variable frequency harmonics. By connecting between the output terminals of the rectifier 5 the branch conforming to the invention, the current wave on the line is always in the form of identical trapezoids, whether or not there is commutation of thyristors. In effect, if at the moment of periodic commutation of the thyristors of the rectifier 5 there is no commutation to be effected in the inverters 2 and 3, at the moment when the instantaneous voltage at the output of the rectifier 5 is negative, the thyristor 18 is initiated, instead of the thyristors 6 and 7.

The branch constituted by the inductance 16 and the thyristor 18 will play the role of a free wheel, but its intervention will be retarded because of the inductance 16. This delay will be determined by the value of the instantaneous voltage and the value of the inductance. The inductance 16 is chosen so that its value is equal to the sum of the loss inductance of the motor and of the mutual inductance 19-29. Under these conditions, the delay will be the same as when there is a commutation to be achieved in the inverters 2 or 3. The free wheeling is thus established identically, and the current disappears in the power supply with the same delay.

In total, the delays for the disappearance of the current in the line and its reappearance are equal whether or not there is concomitant commutation of the thyristors of the inverters 2 or 3.

It is equally possible to utilize such a scheme for the control of an electric motor with a single winding and neutral output, as represented in FIG. 2. In this case, the junction point 8 of the two thyristors 6 and 7 is connected directly to the neutral of the motor 21, while the secondary winding is connected to a single reversible inverter 20, the operation of the circuit being otherwise identical.

Although only certain modes of realization of the invention have been described, it is evident that any modification brought about by the specialist in the field within the same spirit will not depart from the body of the present invention. In particular, the input converter 5 could be constituted by an interrupter connected between the terminal of a direct current power supply in familiar fashion. Furthermore, it is evident that a central unit not represented in the figures controls the actuation of the various thyristors.

I claim:

1. A direct current intermediary circuit of an assembly for transforming input power to output alternating current power by the commutation of input and output static converter means to drive electric motor means connected to the output converter means, the circuit comprising a first branch including in series a free-wheeling switch and a first inductance connected to output terminals of the input converter means, said free-wheeling switch being arranged to be operated upon commutation of the input converter means when the output converter means is not being commutated so as to connect the first inductance to the output terminals of the input converter means; a second branch including in series two thyristors connected to the output terminals of the input converter means; and second and third inductances with a high mutual inductance coupling coefficient, the second and third inductances each being connected to a different output terminal of the input converter means and to a different input terminal of the output converter means, the first inductance having a value selected to be equal to the sum of the loss inductance of the electric motor means and the mutual inductance of said second and third inductances so as to afford substantially the same inductance value on the output terminals of the input converter means upon operation of the free-wheeling switch.

2. A circuit according to claim 1, wherein said switch comprises a thyristor.

* * * * *